(12) United States Patent
Mademlis et al.

(10) Patent No.: US 11,971,185 B2
(45) Date of Patent: Apr. 30, 2024

(54) METHOD FOR IMPROVING THE PERFORMANCE OF THE ENERGY MANAGEMENT IN A NEARLY ZERO ENERGY BUILDING

(71) Applicant: Aristotle University of Thessaloniki—Research Committee E.L.K.E., Salonika (GR)

(72) Inventors: Christos Mademlis, Salonika (GR); Nikolaos Jabbour, Salonika (GR); Evangelos Tsioumas, Salonika (GR)

(73) Assignee: Aristotle University of Thessaloniki—Research Committee E.L.K.E., Salonika (GR)

( * ) Notice: Subject to any disclaimer, the term of this patent is extended or adjusted under 35 U.S.C. 154(b) by 66 days.

(21) Appl. No.: 16/792,936

(22) Filed: Feb. 18, 2020

(65) Prior Publication Data
US 2021/0254848 A1   Aug. 19, 2021

(51) Int. Cl.
*F24F 11/47* (2018.01)
*F24F 11/50* (2018.01)
(Continued)

(52) U.S. Cl.
CPC .............. *F24F 11/47* (2018.01); *F24F 11/50* (2018.01); *F24F 11/88* (2018.01);
(Continued)

(58) Field of Classification Search
CPC .................................................... F24F 11/47
See application file for complete search history.

(56) References Cited

U.S. PATENT DOCUMENTS

2013/0238294 A1   9/2013   Legbedji
2015/0019035 A1*  1/2015   Noda ................. H02J 3/32
                                              700/291

(Continued)

FOREIGN PATENT DOCUMENTS

CN   106439993 A    2/2017
EP     3413421 A1   12/2018

(Continued)

OTHER PUBLICATIONS

Chavali, Phani; "A Distributed Algorithm of Appliance Scheduling for Home Energy Management System", IEEE vol. 5, No. 1, Jan. 2014.

(Continued)

*Primary Examiner* — Nathan L Laughlin
(74) *Attorney, Agent, or Firm* — Cermak Nakajima & McGowan LLP; James Creighton Wray (57) ABSTRACT

An optimal energy management method and a system that implements the method for a nearly zero energy building (nZEB) based on the genetic algorithm technique that can provide an optimal balance between the objectives of energy saving, comfort of the building residents and maximum exploitation of the generated electric energy by the renewable energy sources through the proper utilization of a battery storage system, is developed in this invention. The above can be attained by minimizing a cost function that considers the real-time electricity price, the generated/consumed electric energy by each device, the user preferences, the state-of-charge and the energy price of the battery storage system (BSS), and the weather forecast. the system that implements the optimal energy management method comprises energy and temperature sensors, controllable power switches, a battery storage system and a controller with human machine interface. The outcomes of the energy management system are control signals that regulate the (Continued)

operation of the power switches and the inverter of the battery storage system.

12 Claims, 4 Drawing Sheets

(51) Int. Cl.
  *F24F 11/88*   (2018.01)
  *G05B 19/04*   (2006.01)
  *G05F 1/66*   (2006.01)
  *H02J 3/00*   (2006.01)
  *H02J 7/00*   (2006.01)

(52) U.S. Cl.
  CPC ........... *G05B 19/0405* (2013.01); *G05F 1/66* (2013.01); *H02J 3/004* (2020.01); *H02J 7/0048* (2020.01); *H02J 7/0063* (2013.01); *G05B 2219/2202* (2013.01); *G05B 2219/2614* (2013.01); *G05B 2219/2642* (2013.01); *H02J 2310/12* (2020.01); *H02J 2310/60* (2020.01); *H02J 2310/64* (2020.01)

(56) References Cited

U.S. PATENT DOCUMENTS

| | | | | |
|---|---|---|---|---|
| 2015/0066231 | A1* | 3/2015 | Clifton | ................ H04L 12/2803 |
| | | | | 700/296 |
| 2015/0248118 | A1* | 9/2015 | Li | ............................ F24F 11/30 |
| | | | | 700/295 |
| 2016/0334825 | A1 | 11/2016 | Nesler | |
| 2017/0167747 | A1 | 6/2017 | Zhang | |
| 2017/0176964 | A1 | 6/2017 | O'Keeffe | |
| 2020/0088429 | A1* | 3/2020 | Parker | .................. G05B 13/042 |
| 2020/0295566 | A1* | 9/2020 | Nam | .......................... H02J 3/28 |

FOREIGN PATENT DOCUMENTS

| | | | |
|---|---|---|---|
| EP | 3457513 | A1 | 3/2019 |
| WO | 2013163202 | A1 | 10/2013 |
| WO | 2015084285 | A1 | 6/2015 |

OTHER PUBLICATIONS

Giusti et al.; "Restricted Neighborhood Communication Imp0roves Decentralized Demand-Side Load Management", IEEE vol. 5, No. 1, Jan. 2014.

Heo et al., "Multiobjective Control of Power Plants Using Particle Swarm Optimization Techniques", IEEE vol. 21, No. 2, Jun. 2006.

Inoue et al., "Network Architecture for Home Energy Management System", IEEE vol. 49, No. 3, Aug. 2003.

Mohsenian-Rad et al., "Optimal Residential Load Control With Price Prediction in Real-time Electricity Pricing Environments", IEEE vol. 1, No. 2, Sep. 2010.

Mohsenian-Rad et al., "Autonomous Demand-Side Management Based on Game-Theoretic Energy Consumption Scheduleing for the Future Smart Grid", IEEE vol. 1, No. 3, Dec. 2010.

Molderink et al., "Domestic Energy Management Methodology for Optimizing Efficiency in Smart Grids", 2009 IEEE Bucharest Power Tech Conference, Jun. 28-Jul. 2, Bucharest, Romania.

Sun et al., "Building Energy Management: Integrated Control of Active and Passive Heating, Cooling, Lighting, Shading, and Ventilation Systems", IEEE vol. 10, No. 3, Jul. 2013.

Zhao et al., "An Optimal Power Scheduling Method for Demand Response in Home Energy Management System", IEEE vol. 4, No. 3, Sep. 2013.

* cited by examiner

METHOD FOR IMPROVING THE PERFORMANCE OF THE ENERGY MANAGEMENT IN A NEARLY ZERO ENERGY BUILDING

This application claims the benefit of Greek Application No. 20190100088 filed Feb. 25, 2019, which is hereby incorporated by reference in its entirety as if fully set forth herein.

BACKGROUND OF THE INVENTION

This invention presents a method that improves the performance of the energy management of electric loads, renewable energy sources (RES) and battery storage systems (BSS) in nearly-zero energy buildings (nZEB). Particularly, it is based on the genetic algorithm technique and provides an optimal balance between the objectives of energy saving, comfort of the building residents and maximum exploitation of the generated electric energy by the RES through the proper utilization of an energy storage system. This is accomplished by controlling a system, that comprises power switches and the inverter of a BSS, through control signals which are provided by the energy management algorithm which is housed in a properly configured controller.

The nZEBs are high energy efficient buildings where the required energy is given by RES provided onsite or nearby. The RES and the energy storage systems of a nZEB can be any type. In this invention, photovoltaics (PVs) and wind turbines (WTs) are used as RES and BSS as energy storage systems.

The most important factors that may affect the performance of the energy management in a nZEB are the real-time electricity price, the generated electric energy by the RES, the consumed electric energy by the appliances that are considered as electric loads, the user preferences, the state-of-charge (SoC) and the energy price of the BSS, the weather forecast and the nZEB's construction characteristics. If the energy management system (EMS) considers only the comfort level of the residents, then the electricity utility bills may be increased, whereas if it is aimed only the reduction of the electricity cost, the residents' comfort may be adversely affected. Thus, the EMS should provide a correct balance between the above objectives. Moreover, it should be simple in the implementation and accurate in its actions, so as it can satisfactorily follow the fluctuations of the RES power generation and the consumption of the nZEB appliances.

To address the challenges of improving the energy management in nZEBs, several techniques have been proposed. In CN 106439993 of 22 Feb. 2017, the solar energy is utilized in conjunction with a heat pump to provide heating in the building and hot domestic water. This technique utilizes RES with heat pump, but it does not manage the operation of electric loads of the building.

The US 20170167747A1 of 15 Jun. 2017 aims to improve the energy saving in a building by a system and a method that controls the heating/cooling system. In US 20170176964A1 of 22 Jun. 2017, a system and a method have been developed that estimate the number of people that are in a building. In WO2013163202A1 of 31 Oct. 2013, a technique for monitoring and managing the electric and electromechanical system of a building has been presented. In US20130238294A1 of 12 Sep. 2013, a method for increasing the energy saving in energy buildings has been presented; however, it does not consider the comfort of the residents. In WO2015084285A1, 11 Jun. 2015, an energy management technique is proposed that aims to improve the performance of a building by considering the residents' comfort. The proposed control unit is based on controlling the operation of the appliances by categorizing them in three basic modes, i.e. economy, comfort and empty house mode. However, it does not provide the optimal balance between the objectives of building performance and residents' comfort.

A building manager that includes a communications interface configured to receive information from a smart energy grid has been presented in US 20160334825A1, of 17 Nov. 2016. The control layer includes several control algorithms modules configured to process the inputs and determine the outputs. However, the energy management does not utilize a control method with an optimal cost function that can provide the optimal solution.

An energy optimization system with economic load demand response optimization for buildings has been presented in EP3413421A1, of 12 Dec. 2018; however, it is referred only to the heating, ventilating and air-conditioning (HVAC) equipment. Also, an energy system with load balancing has been presented in EP3457513A1 of 20 Mar. 2019; however, the energy management system does not consider the residents' comfort and preferences for the usage of the electric loads.

Several control methods have been presented that aim to improve the energy management of a nZEB. Specifically, an EMS that can minimize the heating cost by programming the thermal appliances in a building has been presented in A. Molderink, et al., "Domestic energy management methodology for optimizing efficiency in smart grids," in Proc. IEEE Conf. Power Technol, Bucharest, June 2009. Also, an optimal control algorithm that considers the level of residents' comfort and aims to the cost minimization has been proposed in A. Mohsenian-Rad et al., "Optimal residential load control with price prediction in real-time electricity pricing environments," IEEE Trans. Smart Grid, vol. 1, no. 2, pp. 120-133, 2010. However, the above techniques do not consider the impact of the RES in the building performance.

For the development of EMS for buildings, several control methods have been proposed. Specifically, the Giusti, et al., "Restricted neighborhood communication improves decentralized demand-side load management," IEEE Trans. Smart Grid, vol. 5, no. 1, pp. 92-101, 2014 utilizes the integer linear programming technique. The A. H. Mohsenian-Rad, et al., "Autonomous demand-side management based on game-theoretic energy consumption scheduling for the future smart grid," IEEE Trans. Smart Grid, vol. 1, no. 3, pp. 320-331, 2010 uses the game theory. The P. Chavali, et al., "A distributed algorithm of appliance scheduling for home management system," IEEE Trans. Smart Grid, vol. 5, no. 1, pp. 282-290, 2014 uses the distributed algorithm method for appliance scheduling. The B. Sun, et al., "Building Energy Management: Integrated Control of Active and Passive Heating, Cooling, Lighting, Shading, and Ventilation Systems," IEEE Trans. on Autom. Science and Eng., vol. 10, no. 3, pp. 588-602, 2013 utilizes the stochastic dynamic programming technique.

Several techniques have been proposed to manage the energy of a building through genetic algorithms, such as Z. Zhao, et al. "An optimal power scheduling method for demand response in home energy management system," IEEE Trans. Smart Grid, vol. 4, no. 2, p. 1391-1400, 2013). However, the economic impact of the energy storage system utilization has been ignored.

Finally, useful tools that seeks the correct balance between the minimum electricity consumption cost and the residents' comfort in a building have been adopted, such as the particle swarm optimization technique (J. S. Heo, et al., "Multiobjective control of power plants using particle swarm optimization techniques," IEEE Trans. Energy Convers., vol. 21, no. 2, pp. 552-561, 2006) and the home area network architecture technique (M. Inoue, et al., "Network architecture for home energy management system," IEEE Trans. Consum. Electron., vol. 49, no. 3, pp. 606-613, 2003).

Although the EMS s for building applications, that have been published in the technical literature, can successfully provide energy saving considering the residents' comfort, they disregard the energy price of the batteries with respect to the feed in tariff policy of the energy provider. Moreover, they do not examine the potentiality for maximizing the exploitation of the electric energy generated by the RES with respect to the real time energy price, through the proper selection between injecting it to the grid or temporarily storing it in the BSS. Finally, they do not examine the fulfillment of all the above objectives with respect to the aim of providing an optimal balance between the cost of the consuming energy and the residents' comfort.

SUMMARY OF THE INVENTION

This invention presents an energy management method and system that can improve the performance of a nZEB by considering the real-time electricity price, the generated/consumed electric energy by each device, the user preferences, the state-of-charge (SoC) and the energy price of the BSS, the weather forecast, and the nZEB's construction characteristics. Therefore, reduction of the electricity utility bill as well as limitation of the carbon emissions are attained, and also energy saving as well as protection of the battery's lifespan are accomplished. The energy management method of this invention is based on the genetic algorithm technique (GAT) and the outcome is the proper online task scheduling of the programmable electric loads and the proper control of the BSS that are provided as control signals to a system that comprises power switches and the inverter of a BSS. In this invention, although the energy management scheme has been developed for nZEBs with RES consisted by PVs and WTs, it can also cooperate with any other type of RES, by properly changing the control algorithm.

DETAILED DESCRIPTION

Figure 1:
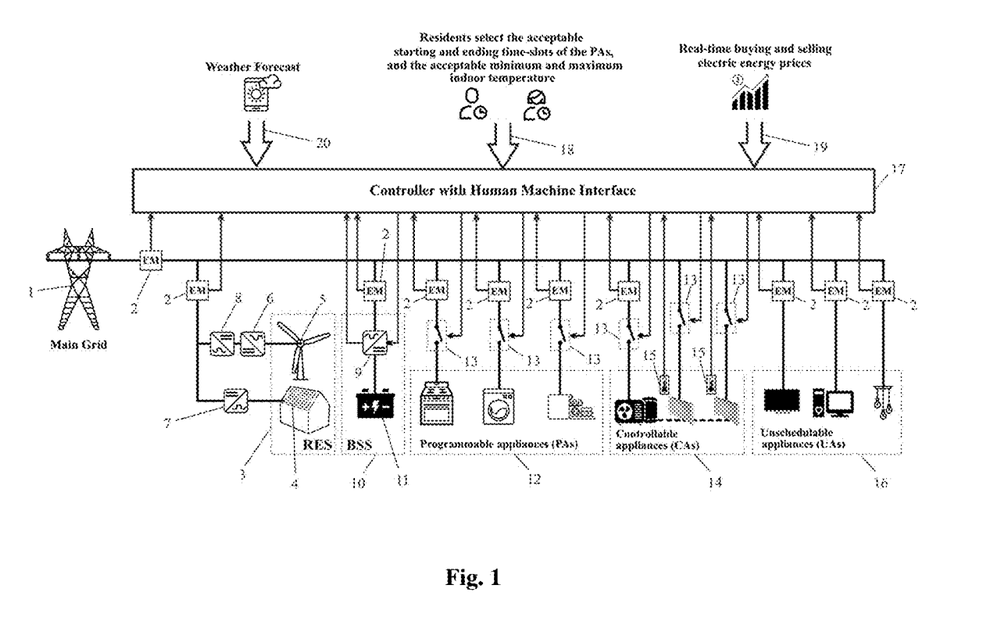
FIG. 1 schematically shows the microgrid of the EMS of the present invention for a nZEB.

In FIG. 1, a typical schematic of the microgrid and the EMS of the present invention for a nZEB is illustrated. It consists of the main grid (1), energy meters (2), temperature sensors (15), RES (3), BSS (10), programmable appliances (12), controllable appliances (14), unschedulable appliances (16) and a controller that houses the energy management software and has the capability to obtain input data through a human machine interface (17), i.e. acceptable starting and ending time-slots of the programmable appliances (18), real time buying and selling electric energy prices (19) obtained by an electric energy provider utility, and weather forecast (20) obtained by a weather forecast utility. The RES comprises the PVs (4), the WTs (5) and the corresponding power converters to connect them with the grid i.e. the AC/DC and DC/AC converters (6) and (8), respectively, for the WT, and the DC/AC converter (7) for the PV. The BSS consists of the battery pack (11) and the DC/AC power inverter to connect the batteries with the grid (9). The programmable appliances (PAs) are electric loads that their operating time can be planned (such as, the electric cooker, the washing machine, dishwasher, ironing, vacuum cleaner, etc.) and controlled by a system of power switches (13). The controllable appliances (CAs) are electric loads that their operation is regulated by one or more variables (such as, the heat pump, the air-conditioner, etc. where control variable is the temperature). The unschedulable appliances (UAs) are electric loads that cannot be programmed and they are switched on/off either manually by the residents (such as, the personal computers, TV, security lighting, etc.) or automatically (such as, the lights regulated by a movement control system) and also, they are appliances that the residents do not have any control action (such as, the refrigerator, water cooler, etc.).

The concept of the present invention that can attain an appropriate balance between the nZEB performance and the comfort of the residents is based on the following operations:
1) time scheduling of the operation of each PA,
2) proper regulation of the operation of each CA, so as the value of the reference variable is within the upper and lower limits set by the residents, and
3) decision for the proper operating mode (i.e. charging or discharging) and the level of the current of the BSS.

The above are realized by:
i) constructing a prediction plan for the estimated energy demand by the loads, the energy that can be stored and recovered by the BSS, and the expected generated energy by the RES,
ii) properly controlling the operation of the PAs, CAs and BSS through the energy management method by considering:
   the consumed or generated or stored electric energy at several devices of the nZEB microgrid (i.e. PAs, CAs, UAs, RES, ad BSS), as well as the absorbed or provided energy to the grid, and the SoC of the BSS, and
   the real time electricity price, the residents' preferences for the acceptable starting and ending time of the PAs and acceptable minimum and maximum indoor temperature, and the weather forecast.

Figure 2:
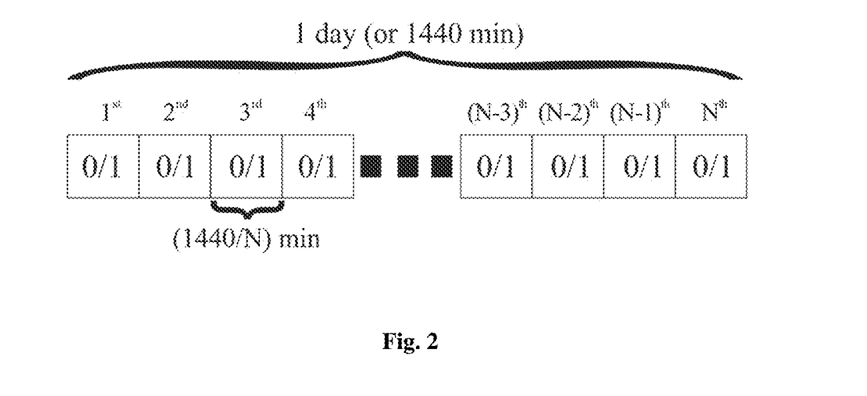
FIG. 2 shows examples of time slots.

The EMS of the present invention is implemented by employing the GAT where the daily operation of each appliance is divided into N discrete time intervals, as shown in FIG. 2. The solution of a genetic algorithm is represented in binary mode as strings of 0/1, where each time-slot k denotes a time interval $\Delta t_k$ that the energy sources and appliances activation or deactivation is represented by the binary 1 or 0, respectively. This means that, at every $\Delta t_k$, the EMS is informed for the new electricity price and can take action on scheduling and controlling the operation of the nZEB's devices. The selection of the sampling rate $\Delta t_k$ is based on the desired accuracy, the computational capability of the controller and the frequency regime of modifying the electricity price by the energy provider. Due to the discrete control in the energy management procedure, the length of the operation of an appliance or an energy source, as that is considered by the EMS, is a rounded integer multiple of the predefined time interval and thus, equal or slightly greater than the actual length of the operation.

The optimal operation of the EMS is accomplished with the following five control sectors.

a) The output power of the wind generator is calculated by the following formula:

$$P_{WT} = \begin{cases} a \cdot u^3 - b \cdot P_N & u_{ci} < u < u_N \\ P_N & u_N \leq u \leq u_{co} \end{cases} \quad (1)$$

where u is the wind speed, $$a = \frac{P_N}{u_N^3 - u_{ci}^3} \text{ και } b = \frac{u_{ci}^3}{u_N^3 - u_{ci}^3} \quad (2)$$

$u_{ci}$, $u_{co}$ and $u_N$ are the cut-in, the cut-out and the nominal wind speeds, respectively, and $P_N$ is the rated power of wind turbine. Thus, for each sampling cycle k that has time duration $\Delta t_k$, the generated electric energy is given by $$e_{WT}(k) = \int_0^{\Delta t_k} P_{WT} dt \quad (3)$$

and the energy generation vector for the N time-slots is $$E_{WT} = [e_{WT}(1) e_{WT}(2) \ldots e_{WT}(N)] \quad (4)$$

In a similar way, by having as inputs the irradiance level $R_{irr}$ and the average temperature of the cells $T_{cell}^{AV}$ that are estimated by the weather forecast, the output power of a PV system for each sampling cycle k is given by $$e_{PV}(k) = \int_0^{\Delta t_k} P_{PV} dt \quad (5)$$

where $$P_{PV} = N_{PV} \left\{ P_{PV_{max}} \frac{R_{irr}}{1000} [1 - a_T (T_{cell}^{AV} - 25)] \right\} \quad (6)$$

and $N_{pv}$ is the number of PV modules, $P_{PVmax}$ is the peak output power of a PV module and $a_T$ is the temperature effect coefficient. The predicted generated electric energy by a PV system for each sampling cycle k is given by $$E_{PV} = [e_{PV}(1) e_{PV}(2) \ldots e_{PV}(N)] \quad (7)$$

Thus, by using the eq. (4) and (7), the total energy production vector by the RES is $$E_{RES} = E_{WT} + E_{PV} \quad (8)$$

b) The energy consumption vector N×M for the appliances of the building is:

$$E_A = \begin{bmatrix} e_A^1(1) & e_A^1(2) & \ldots & e_A^1(N) \\ e_A^2(1) & e_A^2(2) & \ldots & e_A^2(N) \\ \vdots & \vdots & \vdots & \vdots \\ e_A^M(1) & e_A^M(2) & \ldots & e_A^M(N) \end{bmatrix} \quad (9)$$

where, in any $e_A^i(k)$ of the above vector, k is the number of the sampling cycle that each one has time duration $\Delta t_k$ and i is the number of the appliance A, where A={PA, CA, UA}. The N is the number of time-slots per day and M is the maximum number of the appliances in the above three types. For each i PA, additionally to the energy consumption $e_{PA}^i$, three parameters are introduced that their values are provided by the residents, i.e, the $a_{PA}^i$ and $b_{PA}^i$ that denote the acceptable starting and ending time-slot, and the $LoO_{PA}^i$ that represents the duration of the operation of the i PA.

In order to improve the performance of the nZEB, the genetic algorithm seeks the optimal starting time $t_{PA}^i$ of each i PA with the following constraint $$t_{PA}^i \in [a_{PA}^i (b_{PA}^i - LoO_{PA}^i)] \quad (10)$$

and defines the optimal operation starting time vector for the PAs $$t_{PA} = [t_{PA}^1 t_{PA}^2 \ldots t_{PA}^M] \quad (11)$$

The optimal operating starting time matrix for the PAs is $$T_{PA} = \begin{bmatrix} t_{PA}'^1(1) & t_{PA}'^1(2) & \ldots & t_{PA}'^1(N) \\ t_{PA}'^2(1) & t_{PA}'^2(2) & \ldots & t_{PA}'^2(N) \\ \vdots & \vdots & \vdots & \vdots \\ t_{PA}'^M(1) & t_{PA}'^M(2) & \ldots & t_{PA}'^M(N) \end{bmatrix} \quad (12)$$

$$t_{PA}'^i(k) = \begin{cases} 1 & k \in [t_{PA}^i, t_{PA}^i + LoO_{PA}^i) \\ 0 & k \notin [t_{PA}^i, t_{PA}^i + LoO_{PA}^i) \end{cases} \forall i \in [1M], k \in [1N] \quad (13)$$

The energy consumption matrix by the PAs is $$E_{PA} = \begin{bmatrix} e_{PA}^1(1) t_{PA}'^1(1) & e_{PA}^1(2) t_{PA}'^1(2) & \ldots & e_{PA}^1(N) t_{PA}'^1(N) \\ e_{PA}^2(1) t_{PA}'^2(1) & e_{PA}^2(2) t_{PA}'^2(2) & \ldots & e_{PA}^2(N) t_{PA}'^2(N) \\ \vdots & \vdots & \vdots & \vdots \\ e_{PA}^M(1) t_{PA}'^M(1) & e_{PA}^M(2) t_{PA}'^M(2) & \ldots & e_{PA}^M(N) t_{PA}'^M(N) \end{bmatrix} \quad (14)$$

and thus, the total energy consumption by the PAs is given by $$EC_{PA} = \sum_{i=1}^{M} e_{PA}^i(k) t_{PA}'^i(k) = [ec_{PA}^1 \, ec_{PA}^2 \, \ldots \, ec_{PA}^N] \forall k \in [1, N] \quad (15)$$

Finally, the energy consumption of the UAs can be calculated in a week basis by $$EC_{UA} = \sum_{i=1}^{M} e_{UA}^i(k) = [ec_{UA}^1 \, ec_{UA}^2 \, \ldots \, ec_{UA}^N] \forall k \in [1, N] \quad (16)$$

c) One of the goals of the EMS is to manipulate the energy generated by the RES and to decide if it is beneficial to be consumed by the appliances of the building, stored in the batteries or sold to the energy provider. The energy battery storage system vector for the charging and discharging modes of the BSS, respectively, for the N time-slots, are $$E_{BSS}^{ch} = [e_{BSS}^{ch}(1) e_{BSS}^{ch}(2) \ldots e_{BSS}^{ch}(N)] \quad (17)$$

$$E_{BSS}^{dis} = [e_{BSS}^{dis}(1) e_{BSS}^{dis}(2) \ldots e_{BSS}^{dis}(N)] \quad (18)$$

In addition, the genetic algorithm defines the optimal operating time vectors for the charging and discharging modes of the BSS, respectively, as $$T_{ch}=[t_{ch}(1) t_{ch}(2) \ldots t_{ch}(N)] \quad (19)$$

$$T_{dis}=[t_{dis}(1) t_{dis}(2) \ldots t_{dis}(N)] \quad (20)$$

where the $t_{ch}(k)$ and the $t_{dis}(k)$ denote if the BSS is in the charging and discharging modes, respectively, and they can take values of 1 or 0 if the BSS is in operation or not, respectively.

Thus, considering the eq. (17)-(20), the final energy battery storage system vectors for the charging and discharging modes of the BSS, respectively, for the N time-slots, are $$E'_{BSS}{}^{ch}=[e_{BSS}{}^{ch}(1)t_{ch}(1) e_{BSS}{}^{ch}(2)t_{ch}(2) \ldots e_{BSS}{}^{ch}(N) t_{ch}(N)] \quad (21)$$

$$E'_{BSS}{}^{dis}=[e_{BSS}{}^{dis}(1)t_{dis}(1) e_{BSS}{}^{dis}(2)t_{dis}(2) \ldots e_{BSS}{}^{dis}(N)t_{dis}(N)] \quad (22)$$

Since the batteries are charged by the RES, the main cost is the availability cost $C_b$ that is defined as the replacement cost $C_{rep}$ with respect to the total lifetime cycling energy capacity of the battery $Q_{bt}$ and it is calculated by $$C_b = \frac{C_{rep}}{Q_{bt}} \quad (23)$$

The total lifetime capacity is estimated by $Q_{bt}=Q_{br}\cdot DoD$ $[0.9 L_r - 0.1]$, where DoD is the depth-of-discharge that is the maximum discharge with respect to the rated and $L_r$ is the rated lifetime of a battery obtained by the battery datasheet.

d) The objective for high comfort of the residents is determined by the approach that the home appliances should complete their work as soon as possible. This means that, for any i PA, it is aimed to reduce the delay between the starting time that is preferred by the residents and is expressed by the $a_{PA}{}^i$ and the starting time $t_{PA}{}^i$ that has been programmed by the control algorithm of the EMS.

Thus, a variable which can be used to consider the residents' comfort is the delay time rate (DTR), that for each i PA is defined by the following formula $$DTR_{PA}^i = \frac{t_{PA}^i - a_{PA}^i}{b_{PA}^i - (LoO_{PA}^i + a_{PA}^i)} \quad (24)$$

The DTR takes values between 0 and 1 and specifically, the value 0 means high residents' comfort with respect to the priority in satisfying their preferences, while the 1 means the lower acceptable comfort level and thus, the lower acceptable priority in satisfying the residents' preferences.

Based on the above, the residents' comfort level degradation (CLD) is introduced that is determined by the expression $$CLD_{PA} = \sum_{i=1}^{M} r^{(DTR_{PA}^i)} \quad (25)$$

where the r can be any integer greater than 1 (r>1). The above parameter is used to consider the residents' comfort level in the cost function of the EMS optimization problem.

Another parameter that affects the residents' comfort is the proper heating/cooling of the building premises with respect to their preferences. The residents are allowed to determine the acceptable temperature range of the building indoor temperature $T_{in}{}^{min} \leq T_{in} \leq T_{in}{}^{max}$ and the EMS controls the reference temperature $T_{in}{}^{ref}$ in order to both improve the performance of the nZEB and reduce the residents' CLD with respect to heating/cooling. For any sampling cycles k, the latter is defined as $$CLD_{H/C} = \begin{cases} \sum_{i=1}^{N} r^{\left(\frac{T_{in}^{ref}(k)-T_{in}^{max}}{T_{in}^{max}-T_{in}^{min}}\right)} & \text{for heating} \\ \sum_{i=1}^{N} r^{\left(\frac{T_{in}^{ref}(k)-T_{in}^{min}}{T_{in}^{max}-T_{in}^{min}}\right)} & \text{for cooling} \end{cases} \quad (26)$$

Thus, from eqs. (25) and (26), the total comfort level degradation is $$CLD_{tot}=CLD_{PA}+CLD_{H/C} \quad (27)$$

Therefore, the regulation of the reference indoor temperature affects the electric energy consumption of the heat pump and thus the energy consumption vector for the heating/cooling system is $$E_{CA}=E_{H/C}=[e_{H/C}(1) e_{H/C}(2) \ldots e_{H/C}(N)] \quad (28)$$

where $e_{H/C}(k)$ is the electric energy consumption by the heating/cooling system, for each sampling step k.

e) The buying and selling electric energy price vectors are defined, respectively, by $$EEP_{buy}=[EEP_{buy}(1) EEP_{buy}(2) \ldots EEP_{buy}(N)] \quad (29)$$

$$EEP_{sell}=[EEP_{sell}(1) EEP_{sell}(2) \ldots EEP_{sell}(N)] \quad (30)$$

where $EEP_{buy}(k)$ and $EEP_{sell}(k)$ are the buying and selling electric energy price, respectively, for any k sampling cycle $(1 \leq k \leq N)$.

By using the eqs. (1)-(29), the optimization problem that involves the energy generation, consumption and storage options, can be solved by minimizing the following cost function $$J = w_1 CLD_{tot} + w_2[F_1(E_{ep}) + F_2(E'^{dis}_{BSS})] \text{ where} \quad (31)$$

$$F_1(E_{ep}) = \sum_{k=1}^{N} [\lambda \cdot EEP_{buy}(k) + (1-\lambda) \cdot EEP_{sell}(k)] \cdot E_{ep}(k) \quad (32)$$

$$F_2(E'^{dis}_{BSS}) = \sum_{k=1}^{N} C_b E'^{dis}_{BSS}(k) \quad (33)$$

$$E_{ep} = E_{RES}^T - (EC_{PA}^T + EC_{UA}^T + E_{CA}^T) - x(E_{BSS}^{'ch,T} - E_{BSS}^{'dis,T}) \quad (34)$$

$$\lambda = \begin{cases} 0 & E_{ep}(k) \geq 0 \\ 1 & E_{ep}(k) < 0 \end{cases} \quad (35)$$

The parameters $w_1$ and $w_2$ are the weighting factors that represent the importance of the objectives of the comfort level and energy cost respectively ($w_1+w_2=1$, where $0 \leq w_1 \leq 1$ and $0 \leq w_2 \leq 1$).

The parameter x takes values 0 and 1, and it is used to assure in the eq. (34) that the energy which has been generated by the RES and stored in the BSS is equal or higher the amount of energy which has been provided to the appliances by the BSS. The x is equal to 1 when the BSS is active and 0 when it is inactive. This constraint is imposed by the fact that, the BSS should operate as uninterruptible power supply (UPS) in case of electric power outage and the RES could not provide the required amount of electric energy to the appliances.

The optimal starting time $t_{PA}$ of the PAs as defined by the eq. (11) and the reference indoor temperature of the building $T_{in}^{ref}$ considering the residents' comfort level as defined by the eq. (27), as well as the optimal time vectors $T_{ch}$ and $T_{dis}$ for the charging and discharging operation of the battery storage system are determined by the EMS that is realized by utilizing the GAT.

Figure 3:
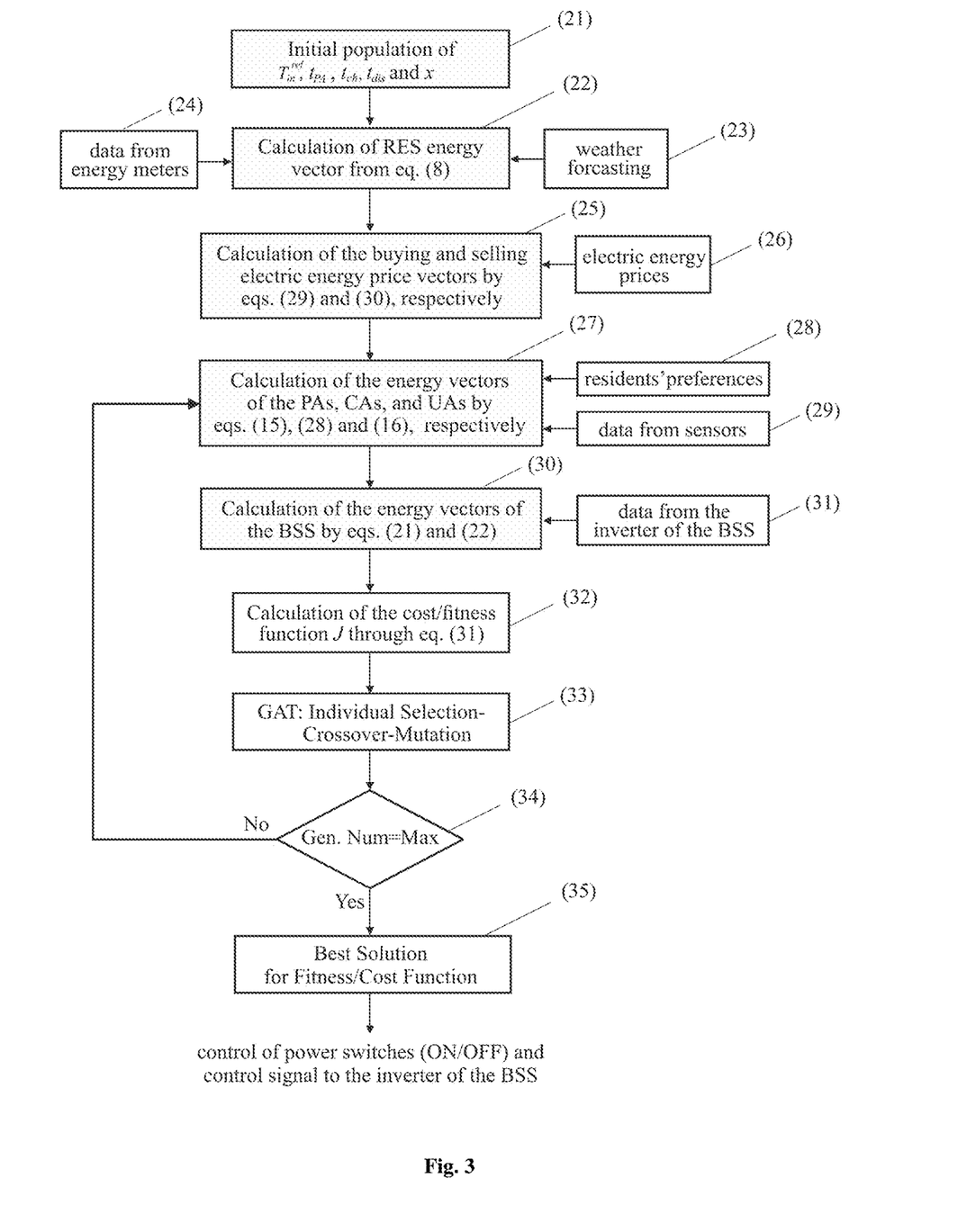
FIG. 3 is a flow chart of the algorithm-based EMS of the present invention.

The flow chart of the genetic algorithm-based EMS of the present invention is illustrated in FIG. 3. The genetic algorithm is initiated by creating a certain number of random "chromosomes" which are sets of possible solutions of the optimization problem [initial population, step (21)]. Then, the RES energy vector is calculated [step (22)], by considering the weather forecasting data (23) and data from energy meters (24). Then, the buying and selling electric energy price vectors are calculated [step (25)], by the predicted electric energy prices (26). The outcomes of the above steps are utilized to calculate the energy demand by the PAs, CAs, and UAs [step (27)], considering data with respect to the residents' preferences (28) and data obtained from sensors (29). Then, the energy vectors of the BSS are calculated [step (30)], considering data obtained from the inverter of the BSS (31). The outcomes of the above steps are imported to a cost/fitness function [step (32)] and the genetic algorithm evaluates the exported fitness values [step (33)]. Then, the best chromosomes are selected and via crossover and mutation, the new solutions are created that include both old and new sets of solutions. Finally, the genetic algorithm evaluates if the expected generation number has been satisfied or not [step (34)] and thus, new sets of solutions are provided as the new generation or the GAT converges to the final solution, by following an iterative procedure that includes the steps (27) to (34). When, the GAT converges and the best solution for the cost function is attained [step (35)], control signals of ON/OFF (digital signals of 1 and 0) are provided to power switches to regulate the operation of PAs and CAs, and control signal to the inverter of the BSS to regulate the operation of the battery (charging or discharging modes).

Figure 4:
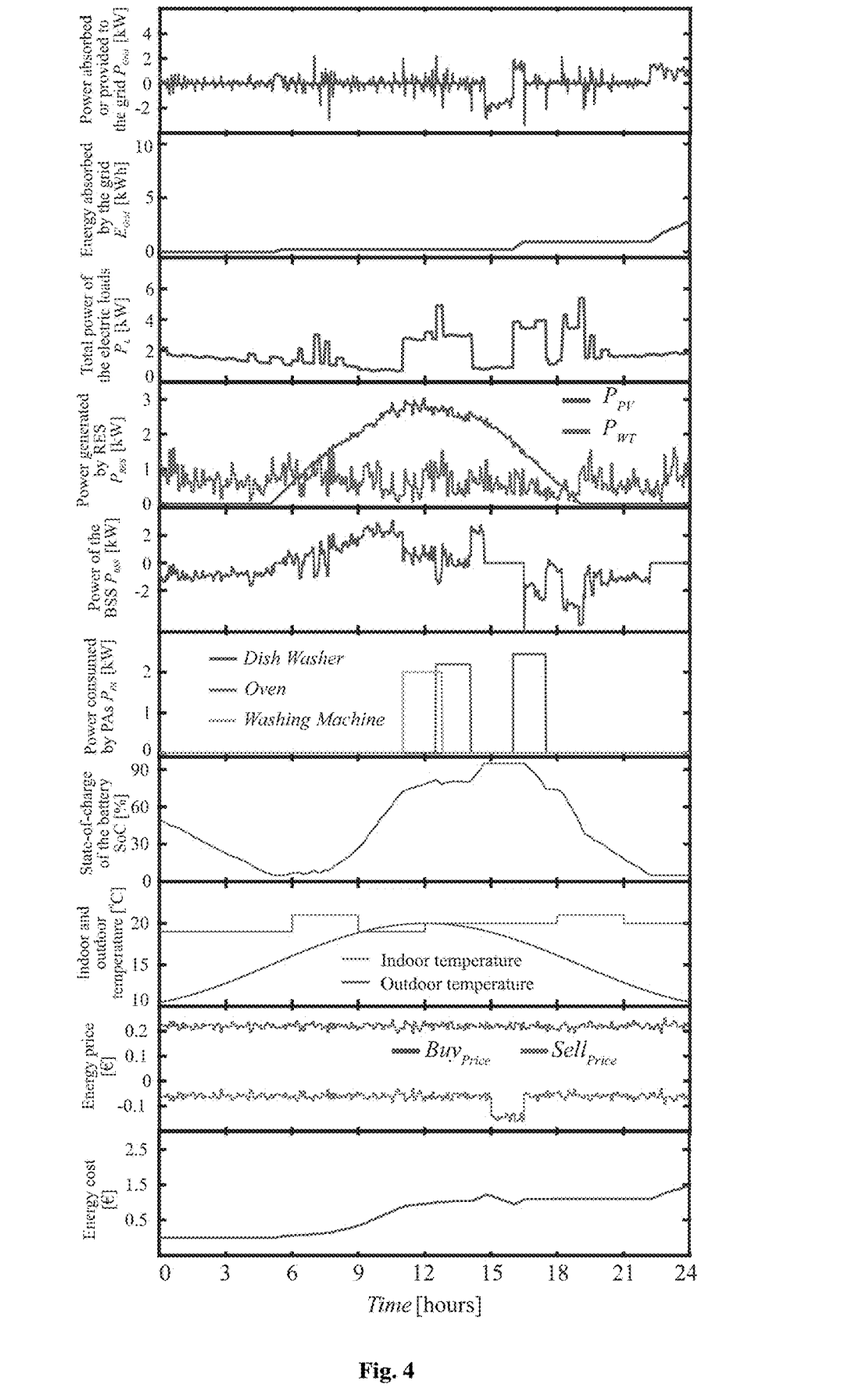
FIG. 4 illustrates the performance of the optimal EMS of the present invention.
Figure 5:
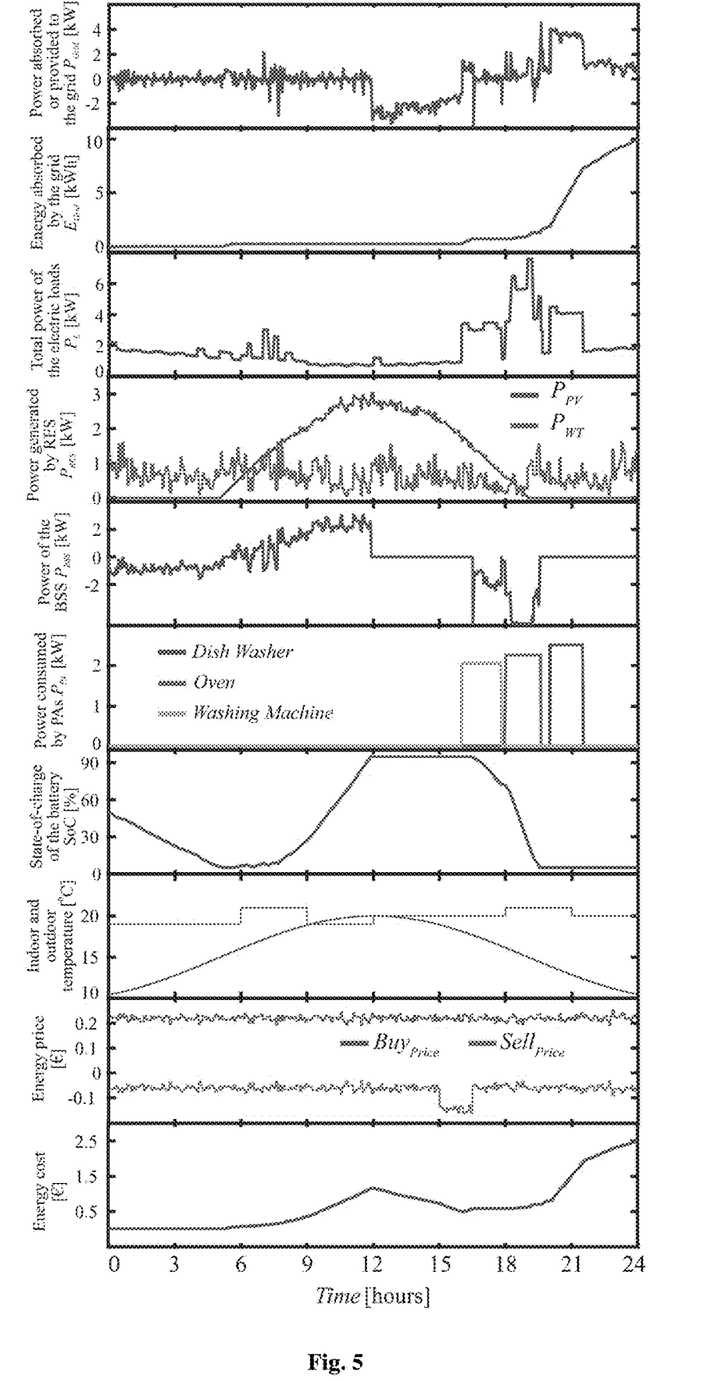
FIG. 5 illustrates performance without the invention.

FIG. 4 illustrates the performance of the optimal EMS of the present invention, in a nZEB over a 24-hours period, and is compared with the case that the electric loads are operated according to the residents' selection without applying an energy management method. As can be seen, lower electric energy is absorbed from the grid in FIG. 4 compared to FIG. 5, due to the proper scheduling of the electric loads that considers the residents' preferences. Specifically, 2.7 kWh is absorbed by the grid, in the examined day, with the optimal EMS of FIG. 4, compared to the 9.8 kWh that is absorbed by the grid, in the examined day for the case of FIG. 5. This is attained because the optimal energy management provides an optimal balance, through the minimization of a properly configured cost function, between the residents' comfort (since the electric loads operate within the acceptable time intervals and the indoor temperature is within the acceptable maximum and minimum temperature range) and the maximum exploitation of the generated electric energy by RES through the proper utilization of the BSS. Moreover, due to the above goals and since the real time energy price is considered, reduction of the total energy cost is attained.

The invention claimed is:

1. A method comprising:
   managing optimal energy of a nearly zero energy building (nZEB); basing the managing on a genetic algorithm technique;
   providing an optimal balance between objectives of energy saving, comfort of building residents;
   using generated electric energy by wind turbines and photovoltaics;
   storing and using energy stored in a battery storage system (BSS), and further comprising:
   the following steps that are referred to a next time period of 24-hours ahead, dividing the next time period into N discrete time slot intervals:
   a) providing opportunity for residents' selecting acceptable starting and ending time considering residents' selection of acceptable starting and ending time-slots for programmable electrical appliances (PAs) (denoted by $a_{PA}^i$ and $b_{PA}^i$, respectively for each of appliance), estimating energy consumption vectors for the PAs, for N time-slots, (denoted by $E_{PA}$), where the PAs are electric loads each with a planned operating time (of an electric cooker, a washing machine, a dishwasher, an iron, a vacuum cleaner),
   b) providing temperature selection opportunity for residents' selecting of minimum and maximum indoor considering the residents' selection of acceptable minimum and maximum indoor temperature of the nZEB (denoted by $T_{in}^{min}$ and $T_{in}^{max}$, respectively), estimating energy consumption vectors of the controllable appliances (CAs), for N time-slots, (denoted by $E_{CA}$), where the CAs are electric loads having operation is regulated by temperature, (heat pumps, and air-conditioners),
   c) estimating for N time-slots energy consumption vectors of the uncontrollable appliances (UAs) (denoted by $E_{uA}$), by utilizing data obtained from energy meters, where UAs are electric loads that cannot be programmed and are switched on/off either manually by the residents (personal computers, TV, security lighting) or automatically (lights regulated by a movement control system) and appliances that residents do not have any control, (refrigerators, water coolers),
   d) estimating for N time-slots, energy production vectors of the wind turbines and the photovoltaics (denoted by $E_{WT}$ and $E_{PV}$, respectively), considering meteorological data obtained by a weather forecast utility, and estimating total energy ($E_{RES}$) generated by the renewable energy sources, the wind turbine and the, photovoltaics determined by $E_{RES}=E_{WT}+E_{PV}$,
   e) estimating for N time-slots, energy vectors of the BSS for charging and discharging modes (denoted by $E'_{BSS}^{ch}$ and $E'_{BSS}^{dis}$, respectively),
   f) estimating for N time-slots, electric energy price vectors of buying and selling (denoted by $EEP_{buy}$ and $EEP_{sell}$, respectively), from estimated buying and selling prices, respectively, obtained from an electric energy utility,
   g) determining values of the acceptable starting and ending time-slots of each i appliance ($a_{PA}^i$ and $b_{PA}^i$, respectively), and the acceptable minimum and maximum indoor temperature ($T_{in}^{min}$ and $T_{in}^{max}$, respectively) provided by the residents in the aforementioned steps a) and b), and the energy vectors $E_{WT}$, $E_{PV}$, $E_{PA}$, $E_{CA}$, $E_{UA}$, $E_{BSS}^{ch}$, $E_{BSS}^{dis}$, and EEP$_{buy}$ which are calculated in the aforementioned steps b) to f), are imported to a cost function and then, by its minimization through the genetic algorithm technique, are provided optimal values, for the N time-slots ahead, of:
controlling vectors of the time-slots of each PA, the reference indoor temperature, and charging or discharging operating modes of the BSS, and
providing optimal value of a parameter denoted by x, that can take values 0 and 1,
assuring that energy generated by RES renewable energy sources and stored in the BSS is equal TO or higher than an amount of energy which has been provided to the appliances by the BSS (x is equal to 1 when the BSS is active and 0 when the BSS is inactive),
h) using optimal values, that are calculated in step g), of the:
controlling vectors of the starting time-slots of each PA, reference indoor temperatures for the N time-slots and the charging or discharging operating modes of the BSS for the N time-slots are provided as input signals to a system that is the optimal energy management method, while,
using a control variable x as input variable at an optimization procedure of a next time sampling, that is realized in step g.

2. The method of claim 1, wherein the genetic algorithm seeks optimal starting time $t_{PA}^i$ of each i-PA, within the N time-slots, considering the constraints that $t_{PA}^i$ is equal-or-higher than the acceptable starting time slot $a_{PA}^i$ which is defined by the residents for each i-PA and also, equal-or-lower than the acceptable ending time slot $b_{PA}^i$ which is defined by the residents for each i-PA, minus the duration of the i-PA operation denoted by $LoO_{PA}^i$ ($a_{PA}^i \leq t_{PA}^i \leq b_{PA}^i - LoO_{PA}^i$).

3. The method of claim 1, wherein with the genetic algorithm seeking an optimal reference indoor temperature $T_{in}^{ref}$ for each of the N time-slots considering a constraint that $T_{in}^{ref}$ is equal-or-higher than the minimum indoor temperature $T_{in}^{min}$ and equal-or-lower than the maximum indoor temperature $T_{in}^{max}$, which are defined by the residents ($T_{in}^{min} \leq T_{in}^{ref} \leq T_{in}^{max}$).

4. The method of claim 1, wherein availability cost of the BSS, denoted by $C_b$, is calculated by a ratio of the replacement cost, denoted by $C_{rep}$, with respect to total lifetime cycling energy capacity of the BSS, denoted by $Q_{bt}$, (namely, $C_b = C_{rep}/Q_{bt}$), where total lifetime capacity is estimated by $Q_{bt} = Q_{br} \cdot DoD[0.9 L_r - 0.1]$ where DoD is depth-of-discharge that is maximum discharge with respect to rated and $L_r$ is the rated lifetime of a battery obtained by the battery datasheet.

5. The method of claim 2, wherein an objective for high comfort of the residents is determined by that home appliances should complete their work as soon as possible and specifically, the residents' comfort is considered in the method by defining the delay time rate (DTR) for each i programmable appliance (PA) that is given by $$DTR_{PA}^i = \frac{t_{PA}^i - a_{PA}^i}{b_{PA}^i - (LoO_{PA}^i + a_{PA}^i)}$$

and takes values between 0 and 1, where the value 0 means high residents' comfort with respect to the priority in satisfying their preferences, while the 1 means the lower acceptable comfort level and thus, the lower acceptable priority in satisfying the residents' preferences.

6. The method of claim 1, wherein residents comfort level degradation with respect to the total PAs of the nZEB (denoted by $CLD_{PA}$) is calculated by $$CLD_{PA} = \sum_{i=1}^{M} r^{(DTR_{PA}^i)},$$

by where M is the total number of the PAs and r is an integer greater than 1 (r>1) that is decided by the fact that, a higher r means higher importance is given to the residents' comfort at the energy management.

7. The method of claim 6, wherein residents comfort level degradation with respect to the heating and cooling (denoted by $CLD_{H/C}$), is calculated by $$CLD_{H/C} = \begin{cases} \sum_{k=1}^{N} r^{\left(\frac{T_{in}^{ref}(k) - T_{in}^{max}}{T_{in}^{max} - T_{in}^{min}}\right)} & \text{for heating mode} \\ \sum_{k=1}^{N} r^{\left(\frac{T_{in}^{ref}(k) - T_{in}^{min}}{T_{in}^{max} - T_{in}^{min}}\right)} & \text{for cooling mode} \end{cases},$$

for any sampling cycles k, (where $1 \leq k \leq N$).

8. The method of claim 7, wherein residents comfort level degradation (denoted by $CLD_{tot}$) is calculated by $CLD_{tot} = CLD_{PA} + CLD_{H/C}$.

9. The method of claim 8, wherein the optimization problem is solved through minimization of the cost function $J = w_1 CLD_{tot} + w_2 [F_1(E_{ep}) + F_2(E'^{dis}_{BSS})]$ utilizing the genetic algorithm technique, by applying an iterative discrete calculation procedure for any sampling cycles k (where $1 \leq k \leq N$), where $$F_1(E_{ep}) = \sum_{k=1}^{N} [\lambda \cdot EEP_{buy}(k) + (1-\lambda) \cdot EEP_{sell}(k)] \cdot E_{ep}(k)$$

$$F_2(E'^{dis}_{BSS}) = \sum_{k=1}^{N} C_b E'^{dis}_{BSS}(k)$$

$$E_{ep} = E_{RES}^T - (EC_{PA}^T + EC_{UA}^T + E_{CA}^T) - x(E'^{ch,T}_{BSS} - E'^{dis,T}_{BSS}) \text{ and}$$

$$\lambda = \begin{cases} 0 & E_{ep}(k) \geq 0 \\ 1 & E_{ep}(k) < 0 \end{cases}$$

considering that the $E_{RES}^T$, $EC_{PA}^T$, $EC_{UA}^T$, $E_{CA}^T$, $E'^{ch,T}_{BSS}$ and $E'^{dis,T}_{BSS}$ are the transpose of the vectors $E_{RES}$, $EC_{PA}$, $EC_{UA}$, $E_{CA}$, $E'^{ch}_{BSS}$ and $E'^{dis}_{BSS}$, respectively, and the $EEP_{buy}$(k), $EEP_{sell}$(k), $E'^{dis}_{BSS}$, and $E_{ep}$(k) are the $k_{th}$-values of the respective energy vectors.

10. The method of claim 1, wherein the parameters $w_1$ and $w_2$ of cost function J are two weighted factors which represent the importance of the objectives of the comfort level and energy cost, respectively, and those provided by the residents according to their preferences, considering the constraints that $w_1 + w_2 = 1$, $0 \leq w_1 \leq 1$ and $0 \leq w_2 \leq 1$.

11. The method of claim 1, wherein the method comprises:
providing energy meters to measure the consumed electric energy by the PAs and CAs, stored or recovered electric energy in or from the BSS, respectively, the generated electric energy by the wind turbines and photovoltaics, and the electric energy that is absorbed by or provided to a grid, providing temperature sensors to measure the indoor temperature of each room of the building, providing controllable power switches to regulate the operation of the PAs and CAs, according to the optimal energy management method, providing inverter of the BSS that controls the charging and discharging operation of the batteries and it is regulated by control signals according to the optimal energy management method, providing controller configured to implement the optimal energy management method, with a human machine interface for the insertion, by the residents, of the acceptable starting and ending time-slots of the PAs, and the acceptable minimum and maximum indoor temperatures.

12. The method of claim 11 further comprising: managing optimal energy method, wherein the controllable power switches are regulated by control signals of values 0 and 1 provided by a controller, and the charging or discharging mode of the BSS is regulated by the inverter of the BSS through a control signal provided by the controller.

* * * * *